Patented Feb. 2, 1943

2,309,680

UNITED STATES PATENT OFFICE 2,309,680

HYDROXY-SUBSTITUTED GUANAMINES

Jack Theo Thurston, Cos Cob, and Donald William Kaiser, Springdale, Conn., assignors to American Cyanamid Company, New York, N. Y., a corporation of Maine No Drawing. Application August 30, 1941, Serial No. 409,129

10 Claims. (Cl. 260—248)

This invention relates to a method of producing 4,6-diamino-1,3,5-triazines in which the 2 position of the triazine ring is connected by means of a carbon-to-carbon bond to a radical having a free hydroxyl group attached thereto, referred to in this specification and claims as hydroxy substituted guanamines.

According to the present invention guanamines are prepared by the reaction of biguanides with lactones. The hydroxy substituted guanamines obtained are for the most part water-soluble and can be condensed with formaldehyde to produce resins which find wide application in a number of fields.

Some of the lactones of the present invention react fairly readily with biguanide but with others the reaction tends to be slow and the yields inadequate. In such cases the reaction can be accelerated by the use of strongly basic condensing agents such as metal alkoxides. This is particularly necessary when a substituted biguanide is used such as phenyl biguanide, allyl biguanide or dimethyl biguanide in order to produce the corresponding N-substituted guanamines.

Advantageously the reaction can be carried out in solution for which purposes lower molecular alcohols are particularly suitable. For example, methanol, ethanol, ethyl ether of ethylene glycol, and the like, may be used. These alcohols are excellent solvents for biguanide and for the lactones but do not have great solubility for the guanamines produced. They therefore constitute the preferred solvents to be used in the present invention.

The invention will be described in greater detail in conjunction with the following examples. The parts are by weight.

Example 1

2-hydroxycinnamoguanamine

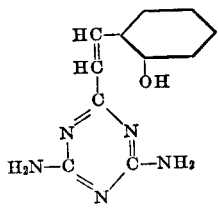

21.2 parts of biguanide were dissolved in 100 parts of methyl alcohol, the solution filtered and then a solution of 29.2 parts of coumarine dissolved in 80 parts of methyl alcohol was added. The reaction took place slowly and was speeded up by the addition of a small amount of sodium methylate. The solution was acidified with acetic acid and evaporated giving a yellow solid which was boiled with water and finally dissolved in the ethyl ether of ethylene glycol. On dilution with an equal volume of naphtha fine light yellow needles, melting at 296° C., were precipitated.

Example 2

2-hydroxymethylbenzoguanamine

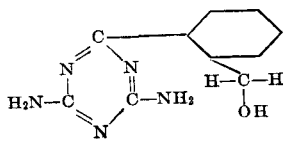

20.2 parts of biguanide were dissolved in 80 parts of methanol and to the filtered solution was added 28.2 parts of phthalide dissolved in 80 parts of methanol, together with the molecular equivalent of sodium methoxide. After standing overnight, the guanamine had partially precipitated and within one-half hour after scratching the sides of the reaction flask, there was a voluminous precipitate. The product was recrystallized from water containing a small amount of ammonia and the plate-like needles melted at 218° C., the yield being just under 45%.

Example 3

2,4,5,7-tetrabrom-6-hydroxy-fluoronyl-o-benzoguanamine

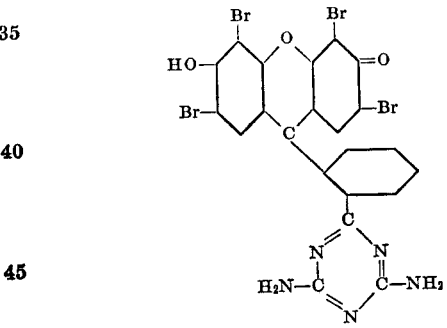

To 64.7 parts of the leuco base of eosin dissolved in 550 parts of the ethyl ether of ethylene glycol was added 14.1 parts of biguanide dissolved in 80 parts of methanol. The solution became dark red and in a short time the guanamine began to precipitate from the solution. After standing overnight the product was removed from the solvent by filtration and washed with methanol. The yield of the product melting at 273° C. was 92.3%. After purification by dissolving in boiling ethylene glycol and precipitating with dioxane, the product was obtained in the form of dark, dense red crystals with a green fluorescence and melted at 275° C.

*Example 4*

ω-hydroxybutyroguanamine

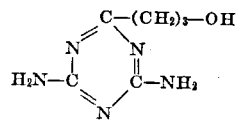

To 52 parts of biguanide dissolved in 300 parts of methanol containing 5.4 parts of sodium methoxide was added 46 parts of butyrolactone. The reaction mixture was stirred at room temperature for about 24 hours. Product began to crystallize slowly from the solution and after filtering the filtrate was concentrated and allowed to stand in order to obtain more product. The crude product amounting to 60 parts was recrystallized from a large volume of butanol.

We claim:

1. A method of producing hydroxy substituted guanamines which comprises reacting a lactone with a biguanide.

2. A method of producing a hydroxy substituted guanamine which comprises reacting a lactone with biguanide.

3. A method of producing 2-hydroxymethylbenzoguanamine which comprises reacting phthalide with biguanide.

4. A method of producing 2-hydroxycinnamoguanamine which comprises reacting coumarine with biguanide.

5. A method of preparing a xanthene-substituted guanamine which comprises reacting biguanide with a xanthene lactone.

6. A method of producing 2,4,5,7-tetrabrom-6-hydroxyfluoronyl-o-benzoguanamine which comprises reacting the leuco base of eosin with biguanide.

7. A method according to claim 1 in which the reaction is effected in solution in a low molecular weight aliphatic alcohol.

8. A method according to claim 2 in which the reaction is effected in solution in a low molecular weight aliphatic alcohol.

9. A method according to claim 1 in which a metal alkoxide is used as a condensing agent.

10. A method according to claim 2 in which a metal alkoxide is used as a condensing agent.

JACK THEO THURSTON.
DONALD WILLIAM KAISER.